Figure 1:
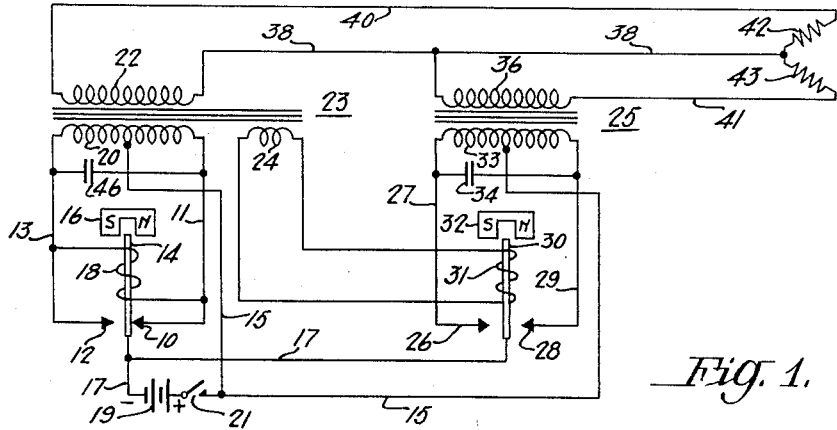

Sept. 18, 1956  H. A. COOK  2,763,829
POWER CONVERSION SYSTEM
Filed Feb. 28, 1951  2 Sheets-Sheet 1

INVENTOR.
Herbert A. Cook
by George V. Eltgroth
Attorney

Sept. 18, 1956 H. A. COOK 2,763,829
POWER CONVERSION SYSTEM
Filed Feb. 28, 1951 2 Sheets-Sheet 2

INVENTOR.
Herbert A. Cook
by George V Eltgroth
Attorney

United States Patent Office 2,763,829
Patented Sept. 18, 1956

2,763,829

POWER CONVERSION SYSTEM

Herbert A. Cook, Baltimore, Md.

Application February 28, 1951, Serial No. 213,161

9 Claims. (Cl. 321—49)

This invention relates to power conversion systems and more particularly to power conversion systems of the type utilizing periodically actuated contacts.

It is well known to use a vibrating interrupter, which may be of the self-excited type, for the conversion of direct current potentials to periodic electric waves whose potential may be adjusted to any desired value through conventional transformer structures. In a typical application, a set of vibrator-controlled contacts is connected to the ends of a center-tapped transformer primary winding, the winding center tap being connected with one terminal of a direct current source, while the oscillating reed of the vibrating contact assembly is linked to the other terminal of the direct current source. The vibrating reed is surrounded by an electrical winding and forms a part of a magnetic circuit. The magnetic circuit and contacts are so disposed that the driving coil, as the electrical winding surrounding the reed is designated, is excited when the circuit to the direct current source is completed and pulls the resilient reed free of the normally engaged contact, interrupting the exciting circuit for the driving coil and setting the resilient reed into oscillation, causing it to periodically engage the other fixed contact, thus alternately connecting the source across one side or the other of the center-tapped transformer primary winding. A secondary winding is coupled to the primary and feeds the load circuits, either directly or through suitable rectifying apparatus.

Such a device produces single-phase output, and is accordingly useful only for the excitation of single phase loads, with all the limitations to which single phase devices are subject. It is well known that many advantages accrue, both in electromechanical apparatus and in direct current circuits using rectifiers, when polyphase power is available. While various well-known phase shifting devices may be used in conjunction with a single phase source to provide polyphase power, such arrangements are suitable only for limited application, because the total power available in all phases is limited to the output capacity of a single interrupter. It has also been proposed to produce polyphase energy by the addition of further sets of contacts to the vibrating reed assembly, which are used to sequentially excite the driving windings of a number of vibrating reed-controlled contact assemblies. Such structures are, of course, nonstandard and, in any event, involve the incorporation of additional contact members with consequent multiplication of failures due to contact defects.

Accordingly, it is a primary object of the invention to provide a new and novel source of periodic electric energy adapted for energization from a unidirectional source.

It is a further object of the invention to provide a new and novel source of polyphase periodic electric energy adapted for excitation from a direct current source.

Still another object of the invention is to provide a new and novel arrangement for delivering power controlled by a plurality of vibrating contact assemblies into a single load configuration.

Yet another object of the invention is to provide an improved phase failure lockout circuit.

Still another object of the invention is to provide a new and novel polyphase source of periodic electric energy using vibrating contact assemblies for control of source connections to transformer primary windings, in which the polyphase operation is obtained without the addition of auxiliary contacts to the vibrating assemblies.

Figure 2:
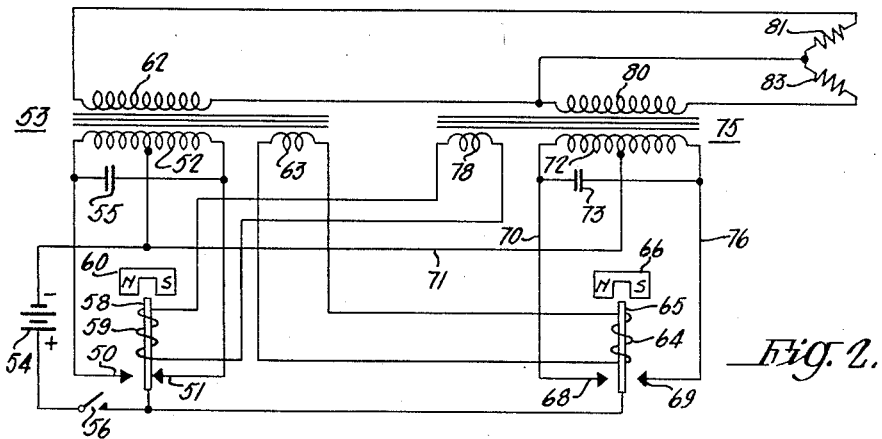
Figure 3:
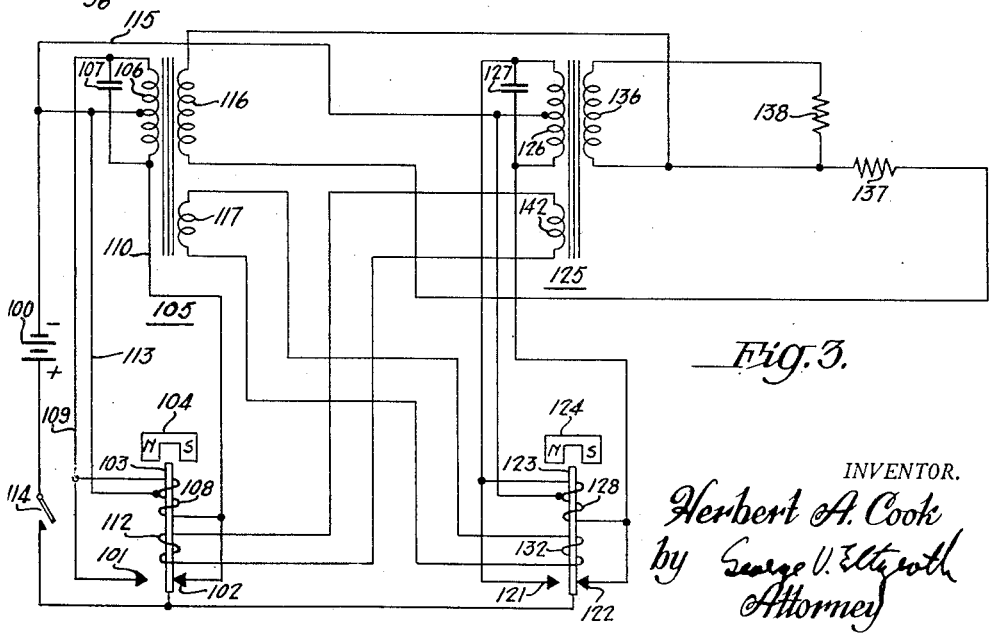
Figure 5:
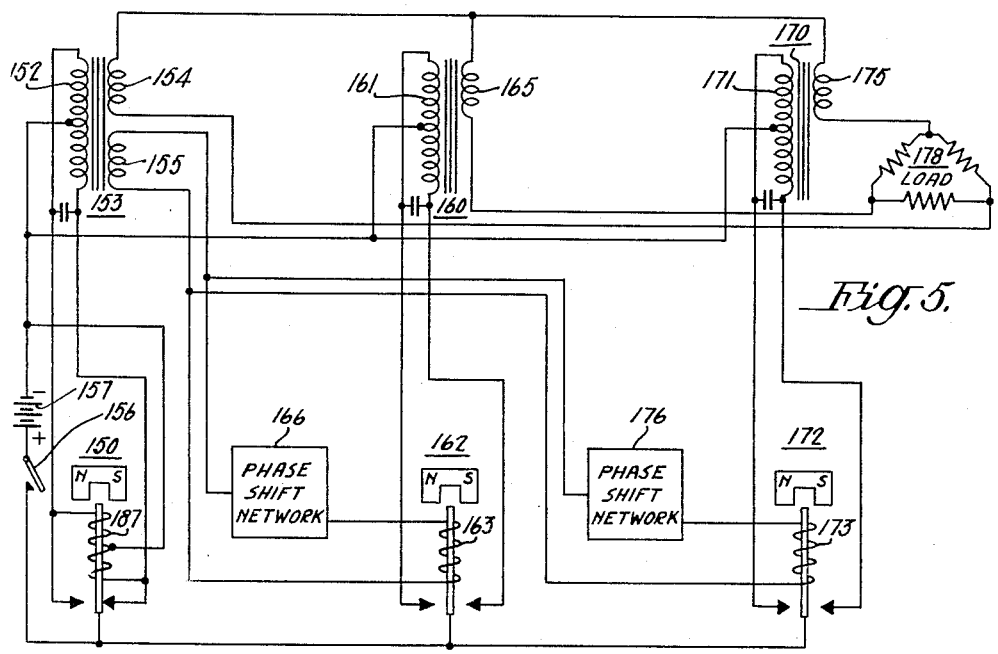
Figure 6:
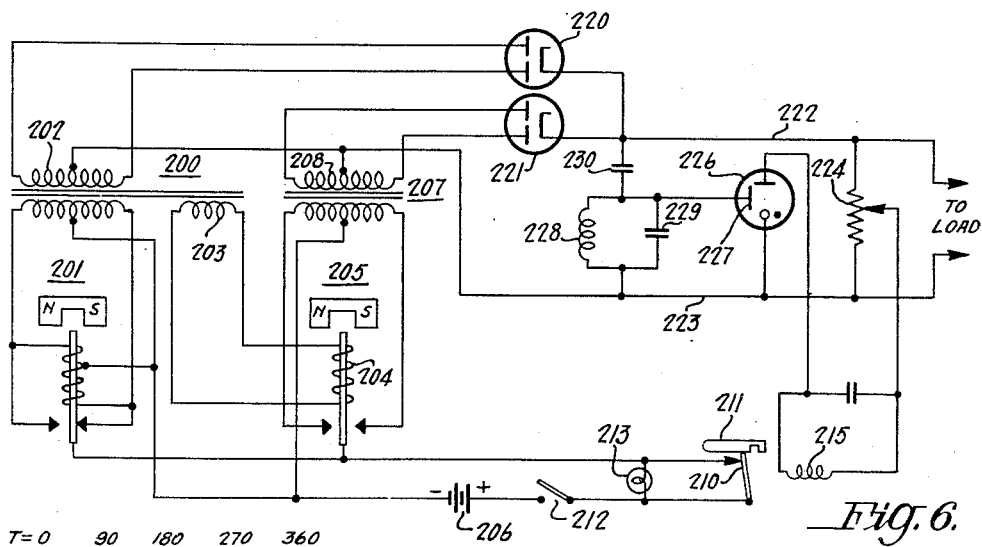
Figure 4:
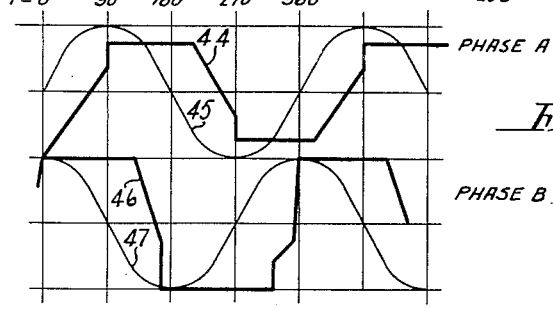

Other objects of the invention will in part be obvious and in part be described when the following discussion is read in conjunction with the drawings in which:

Figure 1 illustrates schematically a source of two-phase alternating electric energy employing single-pole double-throw switching assemblies and one transformer including an auxiliary driving coil energizing winding, Figure 2 illustrates schematically a two-phase source of electric energy incorporating a pair of oscillating contact assemblies with corresponding transformer members having auxiliary windings exciting the driving coils of said assemblies, Figure 3 illustrates schematically an arrangement similar to that of Figure 2 with the modification that an additional reed driving coil is provided for each contact assembly, Figure 4 illustrates typical voltage time relationship observed during the operation of the foregoing circuits, Figure 5 illustrates schematically a circuit incorporating the principles of the invention for developing three-phase periodic electric energy, and Figure 6 illustrates schematically a system for monitoring and indicating failure of one of the vibrating contact assemblies in a polyphase system.

The system of Figure 1 incorporates a first vibrating contact assembly including stationary contact members 10, 12 mounted on either side of a resilient reed 14. The reed 14 normally engages the contact 10. The free end of the reed is situated adjacent a small permanent magnet 16 and a driving winding 18 surrounds a portion of the reed 14. The reed 14 is preferably of paramagnetic resilient material. The contacts 10, 12 are connected to either end of the center-tapped primary winding 20 of a transformer 23, also provided with an output secondary winding 22 and auxiliary secondary winding 24. A capacitor 46 bridges the terminals of the primary winding 20, and the center tap of the winding 20 is linked over the conductor 15 and through the switch 21 to the positive pole of a direct current source 19. The other terminal of the said source 19 is connected over a conductor 17 with the resilient reed 14.

The system of Figure 1 also includes a second set of contacts 26, 28 mounted on either side of the resilient reed 30 surrounded by a driving winding 31 which is connected with the auxiliary winding 24 on the transformer 23. One end of a primary winding 33 on an output transformer 25 is connected over the lead line 27 with the contact 26, and the other end of the primary winding 23 is connected over the line 29 with the contact 28. A capacitor 34 bridges the primary winding 33. An output secondary winding 36 is also incorporated in the structure of the transformer 25. The line 15 connects the center tap of the transformer primary winding 23 with one terminal of the switch 21, while the reed 30 is connected over the line 17 with the negative terminal of the source 19. A small permanent magnet indicated at 32 may be mounted adjacent to the free end of the reed 30.

The secondary winding 22 on the transformer 23 is coupled over the lines 38 and 40 with the load 42 and the secondary winding 36 on the transformer 35 is coupled over the lines 38 and 41 with the load 43.

The power supply system of Figure 1 is placed in operation by closing the switch 21. Driving coil current now flows through the circuit including the line 15, the left side of winding 20, the line 13, driving winding 18, contact 10, reed 14, and line 17 to the negative terminal of the battery 19 while power current of greater magnitude flows through the circuit including the switch 21, line 15, the right side of winding 20, line 11, contact 10, reed 14 and line 17 to battery 19. The field produced by the current flowing in the driving winding 18 interacts with the field of the permanent magnet 16 and draws the reed 14 to the left to disengage the contact 10 from the reed 14 and move the reed 14 into engagement with the stationary contact 12. Driving coil current flows in the reverse direction through the driving winding 18 over the following circuit: From the positive terminal of the source 19 through switch 21, line 15, right side of primary winding 20, lead 11, driving winding 18, lead 13, contact 12, reed 14, and line 17 to the negative terminal of the direct current source 19. At the same time power current of greater magnitude flows through the circuit including switch 21, line 15, the left side of winding 20, line 13, contact 12, reed 14 and line 17 to battery 19. The force exerted on the free end of the reed 14 by the magnet 16 is now reversed, initiating reverse movement by the reed, which continues until the contact 12 is disengaged and contact 10 re-engaged. This process occurs repetitively at the natural frequency of oscillation of reed 14 and alternately connects the source 19 across one side or the other of the primary 20 of the transformer 23 transferring the power current from one side to the other of the primary 20 to develop an alternating voltage in the secondary 22. The driving coil current is small enough with respect to the power current that its effect may be neglected. Switching surges occurring at the instant of contact separation are absorbed in the capacitor 46. This operation gives rise to a voltage wave form appearing across the secondary 22 of the transformer 23 and the secondary 24 of the transformer 25 approximating that shown at 44 in Figure 4.

This voltage is impressed across the driving coil 31 associated with the reed 30 in the second contact assembly and produces an oscillatory motion of reed 30 of sufficient amplitude to bring the reed 30 into engagement with the contacts 26 and 28, thus periodically connecting the direct current source 19 across the respective halves of the primary winding 33 of the transformer 25. A similar surge-absorbing or buffer capacitor 34 connected across the primary winding 33 absorbs the surges incidental to the transfer of conduction between the two sides of the primary 33. The resultant wave form observed across the secondary 36 of the transformer 25 is substantially as illustrated at 46 in Figure 4. The fundamental components of energy delivered by the reeds 44 and 46 have been indicated by the sine representations 45 and 47 lightly sketched in, in association with the corresponding actual voltage wave. By making the natural resonant period of the reed 30 somewhat different than the natural period of the reed 14, a phase difference of substantially 90 degrees is produced between the two periodic wave forms. In a preferred case, the driven or "slave" reed 30 may have a natural frequency higher than the natural frequency of the reed 14, whereby the reed motion leads the applied force wave substantially 90 degrees. This phase shift may be modified by introducing phase shifting elements into the linkage between auxiliary winding 24 and the driving winding 31, as will be apparent from the discussion of the following figures.

In the arrangement of Figure 1, just described, one of the reed and contact assemblies serves as a "master" and the other as a "slave." All the operating energy of the "slave" is derived from the output of the "master" vibrator. Figure 2 illustrates a different approach to the problem of generating two phase displaced voltages in which each of the pair of vibrators employed performs both the functions of both "master" and "slave." Contacts 50 and 51 are connected to the respective ends of the primary winding 52 of a transformer 53. The primary winding 52 is center tapped, the tap being connected with the negative terminal of a source 54. The positive terminal of the source 54 is connected through the switch 56 with a resilient reed 58 mounted for oscillation between the contacts 50, 51. A driving winding 59 electromagnetically excites the reed 58, whose free end is associated with a small permanent magnet 60. The transformer 53 is further provided with an output secondary winding 62 and an auxiliary secondary winding 63. The auxiliary secondary winding 63 is connected with the driving coil 64 of a further reed-driven contact assembly including a reed 65, having its free end adjacent a small permanent magnet 66, movable between stationary contacts 68 and 69. The contact 68 may be connected over the line 70 with one end of the center tapped primary winding 72 on the transformer 75. A buffer capacitor 73 bridges the outer terminals of the winding 72, and the center tap of the said winding is connected over the line 71 with the negative terminal of the direct current source 54.

The other stationary contact 69 is connected over the line 76 with the other end of the center-tapped primary winding 72. The transformer 75 is also provided with auxiliary secondary winding 78 and an output secondary winding 80. The auxiliary secondary winding 63 on the transformer 53 is connected across driving coil 64 associated with the reed 65, and the auxiliary winding 78 on the transformer 75 is connected across the driving winding 59 on the reed 58. The output secondary winding 62 on the transformer 53 is connected with the phase load 81, while the output secondary winding 80 on the transformer 75 may be connected with the phase load 83 over suitable conductors.

Operation of the system of Figure 2 is initiated by closing the switch 56 to complete the following energizing circuit for one-half the primary winding 52: From the positive pole of the battery 54 through switch 56, reed 58, contact 51, winding 52, and the center-tapped thereof to the negative pole of the battery 54. The surge produced in the auxiliary secondary winding 63 by the application of the voltage of the battery 54 across half of the primary winding 52 excites the reed 65 to engage the reed 65 with one of the contacts 68, 69 and produce a similar surge transmitted from the auxiliary secondary winding 78 to the driving winding 59 for the reed 58, moving the reed 58 away from the normally engaged contact 51 into engagement with the contact 50, whereupon the excitation of the driving winding 64 on the reed 65 is reversed. This reverses the reed position and similarly reverses the excitation of the driving winding 59. This process continues repetitively at a natural frequency controlled by the reeds 58 and 65. The relative free oscillation frequencies of the reeds are made different to insure the desired phase shift, considered in conjunction with the phase shift occurring in the electrical driving circuits. The wave forms developed by the circuit of Figure 2 are also similar to those occurring in Figure 4. The distinguishing characteristic of Figure 2 is the driving of one vibrator in response to the contact operation of the second.

The arrangement of Figure 2 may require operation of the switch 56 several times to start satisfactorily. The reliability of the starting operation will be improved substantially by assymetrically locating the contacts 68, 69 about the reed 65, the closer contact being that toward which the reed 65 is urged by the initial current surge observed when the switch 56 is closed. The use of the associated permanent magnets, as at 60, 66, makes possible the use of the positive and negative surges alternately observed in the auxiliary secondary winding.

The arrangement of Figure 3 retains the interlocking advantages of Figure 2 but is more reliable in its starting characteristics. This is achieved by using a main driving winding, with an auxiliary phase controlling winding. A pair of stationary contacts 101, 102 are disposed on either side of a resilient reed 103 provided with a tapped main driving coil 108 and an auxiliary driving coil 112. A small permanent magnet 104 is located adjacent the free end of the reed 103. The contact 102 is normally in engagement with the reed 103 and the driving winding 108 is bridged between the contacts 101 and 102. In addition, the center tapped primary winding 106 of a transformer 105 is also bridged between the contacts 101, 102 and the center tap thereof connected with the negative pole of the battery 100. The driving winding 108 may be center tapped, as shown, and have its center tap returned over the line 113 to the negative pole of the battery 100. The reed 103 is connected with the positive pole of the battery 100 through a switch 114. In addition to the primary winding 106, the transformer 105 is also provided with an output secondary winding 116 and an auxiliary secondary winding 117.

The system of Figure 3 further utilizes a second vibrating reed-controlled contact assembly having fixed contacts 121, 122 disposed on either side of a resilient reed 123. The free end of the reed 123 moves adjacent a small permanent magnet 124, and the reed itself is magnetically associated with the center-tapped main driving winding 128, having its ends bridged between contacts 121 and 122. In addition, a center-tapped primary winding 126 on the transformer 125 is bridged between the contacts 121 and 122 and the center tap thereof returned to the negative pole of the battery 100 over the line 115. A buffer capacitor 127 across the primary winding 126 absorbs the switching surges and transients. The center tap of the main driving winding 128 may also be returned over the line 115 to the negative pole of the battery 100. In addition to the foregoing windings, the transformer 125 is also provided with an output secondary winding 136 and an auxiliary secondary winding 142 which feeds the auxiliary driving winding 112 associated with the reed 103. Likewise, the auxiliary secondary winding 117 of transformer 105, feeds the auxiliary driving winding 132 associated with the reed 123. The output winding 116 of the transformer 105 may feed the phase load 137, while the output secondary winding 136 on the transformer 125 feeds the phase load 138.

The system of Figure 3 is placed in operation by closing the switch 114 to place battery potential across one-half the driving winding 108, developing in the reed 103 a magnetic polarity which cooperates with the magnet 104 to move the reed 103 away from contact 102 toward engagement with contact 101. Such movement continues until the engagement of contact 101 when the polarity of excitation of driving winding 108 is reversed, whereupon the reed 103 is urged toward the winding 102. Upon re-engagement of the contact 102, the foregoing cycle is repeated. Such repetition occurs approximately at the natural frequency of the reed element 103. Operation of the reed 123, cooperating with the contacts 121, 122, under the influence of driving winding 128, occurs in similar fashion. Although the reed and contact assemblies may not be precisely isochronous, the energy crossfed from the auxiliary windings on the transformers 105, 125 through the auxiliary driving windings 117 and 142 forces isochronism with a phase shift determined by the difference in the mechanical impedances of the driven elements and the phase shift introduced in the electrical circuits. Either or both may be modified to secure the desired relative output phases across the loads 137, 138. Again, the wave forms which are observed are similar to those shown in Figure 4. The power requirements of the auxiliary driving windings in Figure 3 are not large since only a relatively small amount of energy is required to maintain the desired isochronism.

A further application of the principles of the invention is to be observed in Figure 5, wherein the assembly indicated at 150 serves as a "master" vibrator governing the connection of the source 157 to the center-tapped primary winding 152 of the transformer 153. In addition, the transformer 153 is also provided with a main output winding 154 and an auxiliary output winding 155. Motive power for the reed of the switching assembly 150 is provided by the driving winding 187 between the stationary contacts and having its center tap returned to the negative pole of the battery 157.

The second output phase in Figure 5 is provided from the transformer 160 whose center-tapped primary winding 161 is connected between the stationary contacts of a vibrating contact assembly 162 having the driving winding 163. Transformer 160 is also provided with output secondary winding 165. A phase shift network 166 connects the driving winding 163 with the output of the auxiliary winding 155 of the transformer 153. The phase shift network may include one or more phase shifting elements such as resistors, capacitors, and inductances. A simple resistor may be used as a phase shifting network, if desired, because of the inductive nature of the impedance presented by the driving winding 163.

The third output phase from the system of Figure 5 is provided from the output secondary 175 of the transformer 170. The center-tapped primary winding 171 of the transformer 170 is connected between the stationary contacts of the reed driven contact assembly 172, having the driving winding 173 connected through a phase shift network 176 with the auxiliary winding 155. The phase shift network 176, in conjunction with the electromechanical characteristics of the reed driven assembly 172, may be so selected as to introduce a phase shift of approximately 120 degrees between the output voltage from the winding 175 and the voltage appearing in the windings 154 and 165. The center tap of the primary winding 171 of the transformer 170, like the center tap of the primary winding 161 of the transformer 160, is returned to the negative pole of the battery 151.

The system of Figure 5 is placed in operation by closing switch 156, which places battery potential across the side of the driving winding 187 of the reed driven contact assembly 150 which is connected with the normally disengaged contact. This initiates vibratory motion of the reed by the process which has already been described in detail to develop periodic electric waves across the primary 152 of theh transformer 153 and secondary windings associated therewith. As already noted, the summation of electrical and mechanical phase shifts associated with the reed driven contact assemblies 162 and 172 are respectively chosen to result in a mutual phase displacement of 120 degrees between the three sets of output voltages which are then delivered to the load indicated generally at 178.

It is possible in such a quasi-parallel arrangement that one of the vibratory contact units may fail, thereby throwing an excessive load on the remaining such units or inducing malfunction in the associated load circuits. The schematic arrangement of Figure 6 illustrates a system obviating this possibility. The transformer 200 is connected with the vibratory contact assembly 201 to develop in the center-tapped secondary winding 202 a periodic electric wave of frequency controlled by the natural period of the vibratory assembly 201. An auxiliary winding 203 of the transformer 200 supplies driving energy to the winding 204 influencing the reed of a further vibratory switching assembly 205 governing the connection of a direct current source 206 to the center-tapped primary of an additional transformer 207 having the center-tapped secondary 208. The reeds of the vibrating contacters may be connected through a normally closed set of contacts at 210 to the switch 212. The normally engaged contacts 210 are bridged by an indicating lamp 213 whose impedance is sufficiently high to prevent operation of the vibrating contacting assemblies when the contacter 210 is in the open position. A latching member 211 retains the contacts 210 in the disengaged position after they have been moved there under the influence of current in the operating winding 215.

The ends of the center-tapped secondary winding 202 may be connected to the anodes of a rectifying valve 220, while the ends of the secondary winding 208 of the transformer 207 are connected with the anodes of the rectifying valve 221. The cathodes of the valves 220 and 221 may be connected together and to the load output line 222. A negative load output line 223 may be connected with the center taps of the windings 202, 208. A resistor 224, provided with an adjustable tap, may be connected between the output lines 222, 223 with the tap linked to one end of the operating winding 215. The other end of the operating winding 215 may be connected with the anode of the cold cathode gas discharge device at 226, which may be of the type commercially designated as OA4G. The cathode of the device 226 is connected with the negative output line 223, while the control electrode 227 is connected with the shunt connected inductance 228 and capacitance 229. The other side of this shunt connected circuit is linked to the negative bus 223 while the control electrode side thereof may be coupled with the positive buss 222 through a capacitor 230. The circuit 228, 229 has constants providing maximum impedance at twice the natural frequency of vibration of the contact assembly 201. The capacitor 230 serves as an isolating impedance, and is comparable in magnitude of reactance to the antiresonant impedance of the circuits 228, 229. Where the additional direct current drain is not serious, the capacitor 230 may be replaced by a resistor or other impedance. When both vibrating units 201 and 205 are operating, only a negligible amount of energy appears on the output of the rectifiers 220, 221 at twice the natural oscillation frequency of the vibrating contactor 201. However, should the vibrating unit 205 fail, a very large output at twice the natural frequency of the vibrator 201 is observed, developing considerable voltage at the control electrode 227, to initiate an electric dicharge in the valve 226 energizing the operating winding 215 to move the contacts 210 to the disengaged position, where they are retained by the latching member 210. The failure is indicated by illumination of the indicating lamp 213.

With all the foregoing in mind, it may be helpful to review some of the differences in characteristics of the various specific circuits. In the arrangement of Figure 1, the "slave" vibrator may be made with its reed normally in engagement with one of the side contacts. Thus, the cost of tooling for a special structure is avoided. Further, where a resilient reed has been mentioned, it is to be understood that any structure providing for the necessary movement of the central element between the side contacts is contemplated. In a specific case, the major portion of the movable element might be rigid, but supported on a spring hinge.

The circuit of Figure 2 has the disadvantage that the failure of either vibrator will halt the operation of the system. The interlocking arrangement of Figure 3 constitutes an improvement thereover, in that the vibrator which has not failed will continue to deliver power to its phase load.

In addition, it is apparent that the "master" vibrator in the "master and slave" arrangements, such as Figure 5, may be completely divorced from any load circuit, and excite only the operating coils of a number of "slave" vibrators corresponding in number and phase displacement of operation to the desired number of output phases. This has the advantage of preventing reaction of load characteristics on the vibrator operation, and may improve the conversion efficiency of the system.

Where buffer capacitors have been bridged across the primary circuits, the same purpose may be served by a properly proportioned capacitor connected across the secondary circuit instead, or in addition thereto, as is well known in the art.

It is thus apparent that there has been described a novel and useful arrangement for the utilization of relatively simple vibrating contact members in the generation of polyphase power. If desired, these principles may also be employed in increasing the output available to a single phase load, by operating a number of vibrating elements at the same frequency and in the same phase and parallelling the outputs from the secondaries of the individual transformers concerned. In addition, a highly useful protective arrangement for interrupting the operation of the apparatus and indicating failure has been shown, adapted for use in conjunction with such polyphase systems. Many other modifications and variations of the invention not departing essentially from the spirit thereof will be obvious to those skilled in the art.

What is claimed is:

1. In electrical apparatus adapted for connection to a source of electrical energy, a first electrical element, a repetitively operable separable contact assembly adapted to connect said first electrical element with said source, a second electrical element, a second electrically driven separable contact assembly adapted to connect said second electrical element with said source, and a driving circuit for said second contact assembly inductively coupled with the circuit including said first electrical element.

2. In electrical apparatus adapted for connection to a source of electrical energy, a first electrical winding, a self-excited switching assembly characterized by a first frequency of oscillation adapted to connect said first electrical winding with said source, a second electrical winding, and a slave excited switching assembly characterized by a different frequency of free oscillation controlled by energy derived from the circuit including said first electrical winding adapted to connect said second electrical winding with said source.

3. In electrical apparatus adapted for connection to a source of electrical energy, a first electrical winding, a self-excited switching assembly adapted to connect said first electrical winding with said source, a second electrical winding, and a slave excited switching assembly controlled by energy derived through a phase shifting network from the circuit including said first electrical winding adapted to connect said second electrical winding with said source.

4. In electrical apparatus adapted for connection to a source of electrical energy, a first electrical winding, a first switching assembly adapted to connect said first electrical winding with said source, first and second electric actuators for said first switching assembly, connections linking said first actuator to the circuit including said first electrical winding, a second electrical winding, a second switching assembly adapted to connect said second electrical winding with said source, third and fourth electric actuators for said second switching assembly, connections linking said third actuator to the circuit including said second electrical winding, a circuit coupling said second electric actuator with the circuit including said second electrical winding, and a circuit coupling said fourth electric actuator with the circuit including said first electrical winding.

5. In electrical apparatus adapted for connection to a source of electrical energy, a first electrical winding, a second electrical winding coupled to said first electrical winding, a self-excited switching assembly adapted to connect said first electrical winding with said source, a plurality of additional electrical windings, a corresponding plurality of additional slave excited switching assemblies controlled by energy from said second electrical winding, and connections adapted to individually connect corresponding ones of said additional electrical windings with said source through corresponding ones of said additional switching assemblies.

6. In combination, a first tapped electrical winding, a second electrical winding coupled with said first winding, first and second stationary electric contacts respectively connected with the ends of said first winding, a first contact driven by a resiliently supported paramagnetic member adapted to oscillate between said first and second stationary contacts and normally in engagement with a predetermined one of them, a first permanent magnet associated with said first paramagnetic member, a third electric winding magnetically associated with said first paramagnetic member and electrically connected between said stationary contacts, conductors extending from the tap on said first electrical winding and said first contact adapted for connection to a source of electric energy, a fourth tapped electrical winding, third and fourth stationary electric contacts respectively connected with the ends of said fourth winding, a second contact driven by a second resiliently supported paramagnetic member adapted to oscillate between said third and fourth stationary contacts, a second polarizing magnet associated with said second paramagnetic member, a fifth electric winding magnetically associated with said second paramagnetic member and excited from said second winding, and conductors extending from the tap on said fourth winding and said second driven contact adapted for connection with a source of electric energy.

7. In a polyphase power supply system, a first vibratory contact assembly, a circuit adapted to connect said contact assembly with a source of electric energy for effecting operation of said first contact assembly, second and third vibratory contact assemblies provided with operating coils and associated polarizing magnets and operable in response to the reaction between a coil produced magnetic field and the field of the polarizing magnet, transformers adapted for connection with a source of electric energy through said second and third contact assemblies, and an electric coupling between said operating coils and the circuit including said first vibratory contact assembly exciting said coils independently of the circuits governed by said second and third contact assemblies.

8. In combination, a first vibrating contact assembly associated with a polarizing magnet and an operating coil, a second vibrating contact assembly associated with a polarizing magnet and an operating coil, a first transformer having a primary winding connected with said first vibrating contact assembly and a secondary winding, a second transformer having a primary winding connected with said second vibrating contact assembly and a secondary winding, circuits coupling at least one of said operating coils with the flux circuit of at least one of said transformers exciting said vibrating contact assemblies in predetermined phase displaced relation, and electric output members extending from said secondary windings.

9. In electrical apparatus adapted for connection to a source of electrical energy, a first electrical winding, a second electrical winding coupled to said first electrical winding, a self-excited switching assembly adapted to connect said first electrical winding with said source, a third electrical winding, and a slave excited switching assembly controlled by energy from said second electrical winding adapted to connect said third electrical winding with said source.

References Cited in the file of this patent

UNITED STATES PATENTS

| | | |
|---|---|---|
| 1,689,502 | Sabbah | Oct. 30, 1928 |
| 1,873,652 | Lord | Aug. 23, 1932 |
| 1,960,599 | Silva | May 29, 1934 |
| 2,056,610 | Leuthold | Oct. 6, 1936 |
| 2,056,655 | Ehrensperger | Oct. 6, 1936 |
| 2,088,474 | Haller | July 27, 1937 |
| 2,123,859 | Winograd | July 12, 1938 |
| 2,134,530 | Philpott et al. | Oct. 25, 1938 |
| 2,443,675 | Brown | June 22, 1948 |
| 2,534,036 | Lamm | Dec. 12, 1950 |
| 2,550,946 | Stevens et al. | May 1, 1951 |